SANTOKH S. LABANA
ELIHU J. ARONOFF
INVENTORS

BY John R. Faulkner,
Olin B. Johnson
ATTORNEYS

United States Patent Office 3,586,527
Patented June 22, 1971

3,586,527
TETRAVINYL-UNSATURATED RESIN PAINT
COMPOSITION AND PAINTING PROCESS
Elihu J. Aronoff, Framingham, Mass., and Santokh S.
Labana, Dearborn Heights, Mich., assignors to Ford
Motor Company, Dearborn, Mich.
Filed Aug. 4, 1969, Ser. No. 847,588
Int. Cl. B44d 1/50; C08f 1/24; C07c 69/52
U.S. Cl. 117—93.31
28 Claims

ABSTRACT OF THE DISCLOSURE

A substrate is coated with a film-forming composition consisting essentially of a unique tetravinyl compound having a molecular weight below about 350, preferably in the range of about 220 to about 1,100, and an alpha-beta olefinically unsaturated paint binder resin having a molecular weight in excess of about 1,000, preferably in the range of about 2,000 to about 20,000, is converted into a tenaciously adhering, solvent-resistant, wear and weather-resistant coating by exposing the coated substrate to ionizing radiation, preferably in the form of an electron beam. This tetravinyl compound is formed by first reacting a diepoxide with acrylic acid and/or methacrylic acid and subsequently reacting the resultant ester condensation product with a vinyl unsaturated acyl halide.

This invention relates to the art of coating. It is particularly concerned with a process of painting a substrate having external surfaces of wood, glass, metal or polymeric solid with a film-forming solution comprising unique tetravinyl compounds and an alpha-beta olefinically unsaturated paint binder resin and crosslinking such film-forming solution into a wear-resistant, weather-resistant, solvent-resistant, tenaciously adhering film by exposing the same to ionizing radiation, preferably in the form of an electron beam, and to the paint used in this process.

In this application, the term "paint" is meant to include pigment and/or finely ground filler, the binder without pigment and/or filler or having very little of the same, which can be tinted if desired. Thus, the paint binder which is ultimately crosslinked by ionizing radiation can be all or virtually all that is used to form the film, or it can be a vehicle for pigment and/or particulate filler material.

Figure 1:
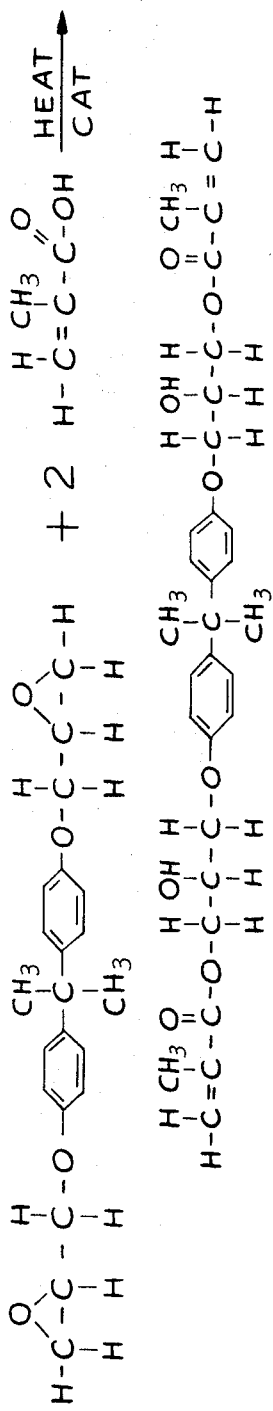
Figure 2:
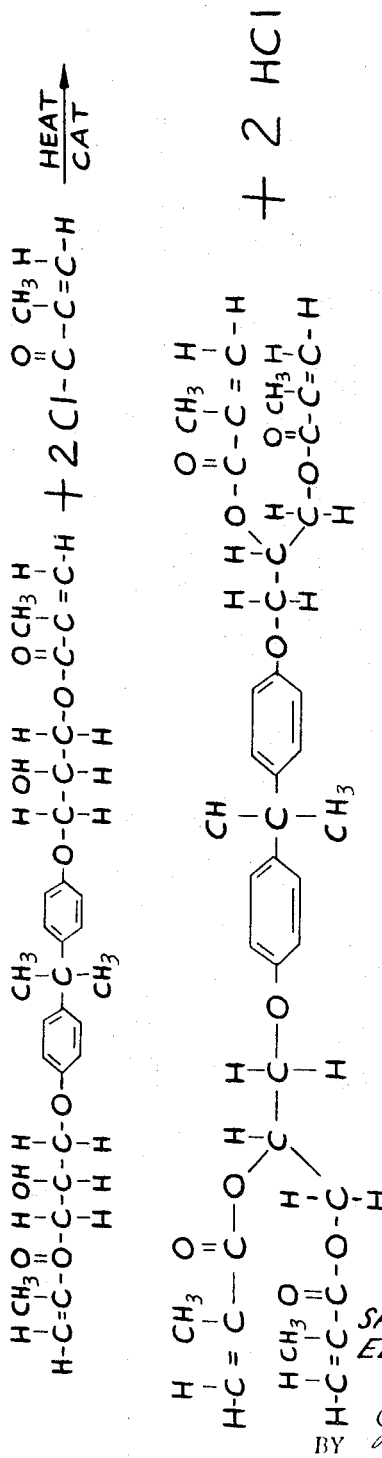

The first reaction step in preparing the tetravinyl compounds used herein is illustrated by the representative reaction shown in FIG. 1 of the accompanying drawing. The second reaction step is illustrated by the representative reaction shown in FIG. 2.

The diepoxides employed as starting materials for preparing the tetravinyl compounds of this invention may be of the epichlorohydrin-bisphenol type, the epichlorohydrin-polyalcohol type, or those prepared by reacting di-olefins with peracides, e.g., peracetic acid, or other means. Diepoxides and their preparation are discussed in detail in Modern Surface Coatings, Paul Nylen and Edward Sunderland, 1965 Science Publishers, a division of John Wiley & Sons Ltd., London-New York-Sydney, Library of Congress Catalog Card Number 65-28344, pp. 197-208. Representative diepoxides include, but not by way of limitation the following:

(1) 3,4-epoxy-6-methyl-cyclohexylmethyl - 3,4 - epoxy-methylcyclohexanecarboxylate.

(2) 1-epoxyethyl-3,4-epoxycyclohexane.
(3) Dipentene dioxide (limonene dioxide).
(4) Dicyclopentadienedioxide.
(5) Diepoxides having structural formula in accordance with the following:

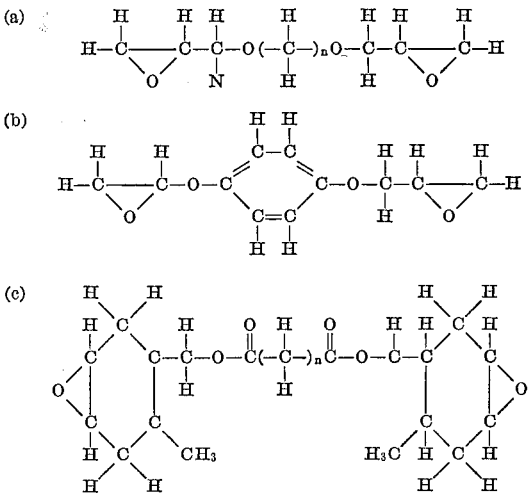

Other suitable diepoxides are disclosed in U.S. Pats. 2,890,202; 3,256,226; 3,373,221 and elsewhere throughout the literature.

The diepoxides employed will usually have molecular weights below about 2,000, more commonly in the range of about 140 to about 500. Usually, the diepoxides will consist of carbon, hydrogen and oxygen but they may be substituted, if desired, with non-interfering substituents, such as halogen atoms, ether radicals and the like. They may be saturated or unsaturated, aliphatic, cycloaliphatic, aromatic or heterocyclic. They may be monomeric or polymeric.

The vinyl unsaturated acyl halides are preferably acryloyl chloride and/or methacryloyl chloride but others may be used, e.g., the corresponding bromides.

The resultant tetravinyl compounds used herein are homopolymerizable and copolymerizable with mono- and divinyl monomers, e.g., styrene, vinyl toluene, alpha-methyl styrene, divinyl benzene, methyl methacrylate, ethyl acrylate, butyl acrylate, butyl methacrylate, hydroxypropyl methacrylate, glycidyl methacrylate, etc., the divinyl reaction product formed by reacting a mono-epoxide with acrylic acid or methacrylic acid and then reacting the resultant ester condensation product with a vinyl unsaturated acyl halide, the divinyl reaction product formed by reacting a diepoxide with two molar parts of acrylic acid or methacrylic acid, the divinyl reaction product formed by reacting a diepoxide with two molar parts of acrylic acid or methacrylic acid and subsequently reacting the resultant ester condensation product with two molar parts of a saturated acyl halide, e.g., acetyl chloride, or an effectively saturated acyl halide, e.g., benzoyl chloride, the divinyl reaction product formed by reacting one molar part of a diepoxide with two molar parts of acrylic acid or methacrylic acid and subsequently reacting the resultant ester condensation product with two molar parts of an alpha-beta olefinically unsaturated acyl halide having an aromatic radical affixed to the beta carbon of the olefinic linkage, e.g., cinnamic acid chloride, alpha-beta olefinically unsaturated polymers, etc.

The tetravinyl adducts used herein have lower viscosities than their corresponding divinyl compounds produced by reacting one mole of diepoxide with two moles of acrylic or methacrylic acid. In relation to such divinyl compounds, the tetravinyl compounds are also more sensitive to ionizing radiation and have increased solubility in organic solvents.

The alpha-beta olefinically unsaturated paint binder resins have molecular weights in excess of about 1,000, preferably in the range of about 2,000 to about 20,000. They consist essentially of carbon, hydrogen and oxygen but they may be substituted, if desired, with non-interfering substituents, such as halogen atoms, nitrogen atoms, ether radicals and the like. They advisedly have their alpha-beta olefinic unsaturation concentration limited to about 0.5 to about 5, preferably about 0.7 to about 3, units per 1,000 units molecular weight. Preferably, they are either polyesters or vinyl monomer comprising copolymers. Suitable alpha-beta unsaturated resins are disclosed in U.S. Pats. 3,437,512; 3,437,513 and 3,437,514.

In accordance with this invention, the paint binder composition, exclusive of nonpolymerizable solvents, pigments and particulate mineral filler, consists essentially of 10 to about 80, preferably about 20 to about 60 parts by weight of the tetravinyl compound and about 90 to about 20, preferably about 80 to about 40, parts by weight of the alpha-beta olefinically unsaturated resin.

It is within the scope of this invention to replace a minor portion, i.e., up to slightly below about 50 weight percent of the tetravinyl compound and/or the alpha-beta olefinically unsaturated resins with monovinyl monomers and/or a divinyl compound consisting essentially of carbon, hydrogen and oxygen and having a molecular weight below about 2,600, preferably about 220 to about 1,100, more preferably about 220 to about 650 such as one of the divinyl compounds hereinbefore mentioned and hereinafter exemplified.

The films formed from the paints of this invention are advantageously cured at relatively low temperatures, e.g., between room temperature (20° to 25° C.) and the temperature at which significant vaporization of its most volatile component is initiated, ordinarily between 20° and 70° C. The radiation energy is applied at dose rates of about 0.1 to about 100 Mrad per second upon a preferably moving workpiece until the wet film is converted to tack-free state or until the film is exposed to a desired dosage.

The film-forming material advisedly has an application viscosity low enough to permit rapid application to the substrate in substantially even depth and high enough so that at least 1 mil (0.001 inch) film will hold upon a vertical surface without sagging. Such films will ordinarily be applied to an average depth of about 0.1 to about 4 mils with appropriate adjustment in viscosity and application technique. It will be obvious to those skilled in the art that the choice of diepoxide used in preparing the tetravinyl compound can be varied so as to vary the viscosity of the resultant product. Likewise, the viscosity of the total film-forming composition can be varied by the concentration and choice of vinyl monomers or other polymerizable components of the coating composition such as the aforementioned resins. The viscosity can also be adjusted by the addition of nonpolymerizable, volatile solvents, e.g., toluene, xylene, acetone, etc., which can be flashed off after application. By one or more of such adjustments, the viscosity of the paint binder solution can be adapted for application by conventional paint application techniques, e.g., spraying, roll coating, etc. The paint binder is preferably applied to the substrate and cured thereon as a continuous film of substantially even depth.

This invention will be more fully understood from the following illustrative examples.

EXAMPLE 1

A tetravinyl compound is prepared in the manner below set forth from the materials hereinafter named:

(1) To a reaction vessel equipped with condenser, stirrer, nitrogen inlet and thermometer are charged the following materials:

| | Parts by weight |
|---|---|
| (a) Diepoxide [1] | 192 |
| (b) Methacrylic acid | 86 |
| (c) Toluene (solvent) | 500 |
| (d) Dimethyl benzylamine (catalyst) | 1 |

1 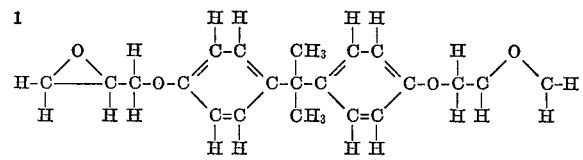

(2) The diepoxide, the methacrylic acid and the dimethyl benzylamine are intimately mixed and incrementally added to the toluene which is at 90° C. in a nitrogen atmosphere.

(3) The reaction mixture is maintained at 90° C. until reaction of the epoxide groups is essentially complete as measured by a product acid number of less than about 10.

(4) The solvent is removed under vacuum and a solid reaction product (softening point 45° C.) is recovered.

(1) The solid reaction product of (4) in the amount of 280 parts by weight is dissolved in 500 parts by weight toluene, 110 parts by weight of methacryloyl chloride are added dropwise with the reaction mixture maintained at 65° C. until HCl evolution ceases.

(6) The solvent is removed under vacuum and a tetravinyl compound is recovered in the form of a viscous liquid.

An alpha-beta olefinically unsaturated vinyl resin, Resin A, is prepared in the following manner:

| Starting materials: | Parts by weight |
|---|---|
| Xylene | 600 |
| Methyl methacrylate | 196 |
| Ethyl acrylate | 333 |
| Glycidyl methacrylate | 71 |
| Azobisiso butyronitrile | 6 |
| Hydroquinone | 0.12 |
| Methacrylic acid | 42 |
| Triethyl amine | 0.96 |

Procedure

The solvent, xylene, is charged to a flask fitted with a stirring rod, an additional funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers, excepting the methacrylic acid, and initiator (azobisiso butyronitrile) is added to the refluxing solution evenly over a two-hour period. The initiator weight is 10 parts by weight per 1,000 parts by weight of vinyl monomers. The reaction solution is refluxed until the conversion of monomer to polymer is greater than about 97 percent.

In the second step, hydroquinone is added as an inhibitor and then the methacrylic acid is added to react with the epoxy groups on the polymer. Triethyl amine is used as a catalyst. This esterification reaction is carried out at reflux temperatures until about 80 percent esterification is accomplished (determined by residual acid number). The xylene is then removed by vacuum distillation and the polymer dissolved in methyl methacrylate so that the weight ratio of polymer to solvent is two.

Substrates of wood, metal and polymeric solid, i.e., polypropylene and acrylonitrile-butadiene-styrene copolymer, are coated with a paint binder consisting essentially of this tetravinyl compound and Resin A using the following procedure:

(1) Twenty (20) parts by weight of the tetravinyl compound is mixed with 80 parts by weight of Resin A and diluted to spraying viscosity with acetone. This solution is sprayed upon the aforementioned substrates to an average depth of about 1 mil (0.001 inch) and the solvent flashed off. The coated substrate is passed through a nitrogen atmosphere and at a distance of about 10 inches below the electron emission window of a cathode ray type, electron accelerator through which an electron beam is projected upon the coated surface until the wet coating is polymerized to a tack-free state. The electrons of this beam have an average energy of about 275,000 volts with a current of about 25 milliamperes.

(2) A second group of substrates are coated in the manner above set forth using the same conditions and materials except for the single difference that the paint binder solution used consists of 60 parts by weight of the tetravinyl compound, 40 parts by weight of Resin A, and said acetone.

(3) A third group of substrates are coated in the manner above set forth using the same conditions and materials except for the single difference that the paint binder solution used consists of 10 parts by weight of the tetravinyl compound, 90 parts by weight of Resin A, and said acetone.

(4) A fourth group of substrates are coated in the manner above set forth using the same conditions and materials except for the single difference that the paint binder solution used consists of 80 parts by weight of the tetravinyl compound, 20 parts by weight of Resin A, and said acetone.

EXAMPLE 2

The procedure of Example 1 is repeated with the following differences: (1) Resin A is replaced with a polyester resin, Resin B hereinafter described, (2) the irradiation atmosphere is helium, and (3) the electron beam used has an average energy of about 350,000 electron volts.

Preparation of Resin B

Starting materials: Parts by weight
Maleic anhydride _____ 14.7
Tetrahydrophthalic anhydride _____ 72.3
Neopentyl glycol _____ 75.0
Dibutyl tin oxide, catalyst _____ 7.06

Procedure

To a reaction vessel, the reactants are charged and then heated to about 340° F. and held at this temperature for one hour. The temperature of the charge is then raised to 440° F. and maintained at such temperature until the acid number of the resulting resin is below about 20. The excess glycol and water are removed by vacuum and when the acid number is below about 10, there are added 0.03 part by weight hydroquinone.

EXAMPLE 3

The procedure of Example 2 is repeated with the sole difference that Resin B is replaced with an equal amount by weight of Resin C, a polyester prepared by the procedure used to prepare Resin B except that an equimolar amount of phthalic anhydride is substituted for the tetrahydrophthalic anhydride.

EXAMPLE 4

The procedure of Example 2 is repeated with the sole difference that Resin B is replaced with an equal amount by weight of Resin D, a polyester prepared by the procedure used to prepare Resin B except that an equimolar amount of ethylene glycol is substituted for the neopentyl glycol.

EXAMPLE 5

The procedure of Example 2 is repeated with the sole difference that Resin B is replaced with an equal amount by weight of Resin E, a polyester prepared by the procedure used to prepare Resin B except that an equimolar amount of trimellitic anhydride is substituted for the tetrahydrophthalic anhydride.

EXAMPLE 6

The procedure of Example 2 is repeated with the sole difference that Resin B is replaced with an equal amount by weight of Resin F, a polyester prepared by the procedure used to prepare Resin B except that an equimolar amount of pentaerythritol is substituted for the tetrahydrophthalic anhydride.

EXAMPLE 7

The procedure of Example 2 is repeated with the sole difference that Resin B is replaced with an equal amount by weight of Resin G, a polyester prepared by the procedure used to prepare Resin B except that an equimolar amount of 1,6-hexamethylene glycol is substituted for the neopentyl glycol.

EXAMPLE 8

The procedure of Example 2 is repeated with the sole difference that Resin B is replaced with an equal amount by weight of Resin H, a polyester prepared by the procedure used to prepare Resin B except that an equimolar amount of fumaric acid is substituted for the maleic anhydride.

EXAMPLE 9

The procedure of Example 2 is repeated with the sole difference that Resin B is replaced with an equal amount by weight of Resin I, a polyester prepared by the procedure used to prepare Resin B except that an equimolar amount of 2-butene-1,4-diol is substituted for the neopentyl glycol.

EXAMPLE 10

The procedures of Examples 1 and 2 are repeated in those embodiments wherein a nonpolymerizable solvent is employed with the sole difference that the acetone is replaced by toluene.

EXAMPLE 11

The procedure of Example 1 is repeated with the sole difference that Resin A is replaced with a different vinyl monomer comprising resin, Resin J.

Preparation of Resin J

Starting materials: Parts by weight
Methyl methacrylate _____ 400
Ethyl acrylate _____ 400
Hydroxy ethyl methacrylate _____ 195
Toluene _____ 1000
Benzoyl peroxide _____ 30

Procedure

Step I.—The benzoyl peroxide is dissolved in a solution of the methyl methacrylate, ethyl acrylate and hydroxy ethyl methacrylate and one-half of the toluene. This solution is added incrementally to the remainder of the toluene at reflux over a seven-hour period with a final pot temperature of about 138°–140° C. Reflux is maintained for another three hours and the solution cooled.

Step II.

Parts by weight
Solution from Step I _____ 500
Acryloyl chloride _____ 33.8
Toluene _____ 30

The solution of Step I is heated to 60° C. and a solution of the acryloyl chloride and toluene are added dropwise over a four hour period while the temperature is allowed to rise to about 90° C.

After heating for another 2.5 hours, the polymer is recovered by vacuum distillation.

EXAMPLE 12

The procedure of Example 1 is repeated with the sole difference that Resin A is replaced with a different vinyl monomer comprising resin, Resin K.

Preparation of Resin K

| Starting materials: | Parts by weight |
|---|---|
| Ethyl acrylate | 39 |
| Methyl methacrylate | 24 |
| Allyl alcohol | 36 |
| Benzoyl peroxide | 1 |
| Xylene | Solvent |

Procedure

Step I.—To a reaction vessel provided with a condenser, thermometer, agitator, and dropping funnel there are charged an amount of xylene equal in weight to the reactants to be added in the first reaction step. The xylene is heated to about 100°–120° C. The four reacting materials are thoroughly mixed and added slowly with a dropping funnel to the heated xylene over a period of four hours. The reaction is held at this temperature for 1–2 hours after addition is complete and then cooled to room temperature. A second step reaction is carried out with the following materials:

| Step II. | Parts by weight |
|---|---|
| Copolymer from Step I, in xylene | 69 |
| Allyl glycidyl ether | 30.8 |
| Potassium hydroxide | 0.2 |

A solution of the allyl glycidyl ether and potassium hydroxide is added to the copolymer at room temperature. The mixture is then heated to a temperature of about 100°–120° C. This temperature is maintained for about 7 hours and allowed to cool. The polymeric reaction product is separated from xylene by vacuum distillation.

EXAMPLE 13

The procedure of Example 1 is repeated except that the diepoxide employed is 3,4-epoxy-6-methyl cyclohexylmethyl-3,4-epoxymethyl-cyclohexanecarboxylate.

EXAMPLE 14

The procedure of Example 2 is repeated except that the diepoxide employed is 1-epoxyethyl-3,4-epoxycyclohexane.

EXAMPLE 15

The procedure of Example 1 is repeated except that the diepoxide employed is dipentene dioxide.

EXAMPLE 16

The procedure of Example 2 is repeated except that the diepoxide employed is dicyclopentadienedioxide.

EXAMPLE 17

The procedure of Example 1 is repeated except that the diepoxide employed has structural formula in accordance with the formula hereinbefore set forth and identified as diepoxide (5)a wherein $n$ is 4.

EXAMPLE 18

The procedure of Example 2 is repeated except that the diepoxide employed has structural formula in accordance with the formula hereinbefore set forth and identified as diepoxide (5)b.

EXAMPLE 19

The procedure of Example 1 is repeated except that the diepoxide employed has structural formula in accordance with the formula hereinbefore set forth and identified as diepoxide (5)c wherein $n$ is 4.

EXAMPLE 20

The procedure of Example 1 is repeated with the sole difference that methacryloyl bromide is used in lieu of methacryloyl chloride.

EXAMPLE 21

The procedure of Example 1 is repeated with the sole difference that acryloyl chloride is substituted for the methacryloyl chloride.

EXAMPLE 22

The procedure of Example 1 is repeated with the sole difference that acryloyl bromide is substituted for the methacryloyl chloride.

EXAMPLE 23

The procedure of Example 1 is repeated with the sole difference that the diepoxide is first reacted with a mixture of acrylic acid and methacrylic acid and subsequently reacted with the methacryloyl chloride.

EXAMPLE 24

A tetravinyl compound is prepared as in Example 1 and a divinyl compound is prepared using the same procedure with the single exception that butyric acid chloride is substituted for the second step reactant methacryloyl chloride used in the preparation of the tetravinyl compound. Substrates are then coated as in Example 1 with the sole difference that in the paint binder solution 49 weight percent of the tetravinyl compound is replaced with an equal amount by weight of said divinyl compound.

Additional substrates are coated in like manner except that in the paint binder solution 1 weight percent of the tetravinyl compound is replaced with an equal amount by weight of said divinyl compound.

Additional substrates are coated in like manner except that in the paint binder solution 25 weight percent of the tetravinyl compound is replaced with an equal amount by weight of said divinyl compound.

Additional substrates are coated in like manner except that in the paint binder solution 1 weight percent of Resin A is replaced with an equal amount by weight of said divinyl compound.

Additional substrates are coated in like manner except that in the paint binder solution 25 weight percent of Resin A is replaced with an equal amount by weight of said divinyl compound.

Additional substrates are coated in like manner except that in the paint binder solution 49 weight percent of Resin A is replaced with an equal amount by weight of said divinyl compounds.

EXAMPLE 25

A tetravinyl compound is prepared as in Example 1 and a divinyl compound is prepared using the same procedure with the single exception that cinnamic acid chloride is substituted for the second step reactant methacryloyl chloride used in preparation of the tetravinyl compound. Substrates are then coated as in Example 1 with the sole difference that in the paint binder solution 49 weight percent of the tetravinyl compound is replaced with an equal amount by weight of said divinyl compound.

Additional substrates are coated in like manner except that in the paint binder solution 1 weight percent of the tetravinyl compound is replaced with an equal amount by weight of said divinyl compound.

Additional substrates are coated in like manner except that in the paint binder solution 25 weight percent of the tetravinyl compound is replaced with an equal amount by weight of said divinyl compound.

Additional substrates are coated in like manner except that in the paint binder solution 1 weight percent of Resin A is replaced with an equal amount by weight of said divinyl compound.

Additional substrates are coated in like manner except that in the paint binder solution 25 weight percent of Resin A is replaced with an equal amount by weight of said divinyl compound.

Additional substrates are coated in like manner except that in the paint binder solution 49 weight percent of Resin A is replaced with an equal amount by weight of said divinyl compound.

EXAMPLE 26

A tetravinyl compound is prepared as in Example 1 and a divinyl compound is prepared using the same procedure with the single exception that 1 molar part of cyclopentene oxide is reacted with 1 molar part of methacrylic acid to open the epoxide ring and provide a monovinyl compound and with one molar part of methacryloyl chloride at the hydroxyl resulting from the first reaction to provide a divinyl compound. Substrates are then coated as in Example 1 with the sole difference that in the paint binder solution 49 weight percent of the tetravinyl compound is replaced with an equal amount by weight of said divinyl compound.

Additional substrates are coated in like manner except that in the paint binder solution 1 weight percent of the tetravinyl compound is replaced with an equal amount by weight of said divinyl compound.

Additional substrates are coated in like manner except that in the paint binder solution 25 weight percent of the tetravinyl compound is replaced with an equal amount by weight of said divinyl compound.

Additional substrates are coated in like manner except that in the paint binder solution 1 weight percent of Resin A is replaced with an equal amount by weight of said divinyl compound.

Additional substrates are coated in like manner except that in the paint binder solution 49 weight percent of Resin A is replaced with an equal amount by weight of said divinyl compound.

EXAMPLE 27

A tetravinyl compound is prepared as in Example 1 and a divinyl compound is prepared using the same procedure employed in the first step of preparing the tetravinyl compound. Substrates are coated as in Example 1 with the sole difference that in the paint binder solution 49 weight percent of the tetravinyl compound is replaced with an equal amount by weight of said divinyl compound.

Additional substrates are coated in like manner except that in the paint binder solution 1 weight percent of the tetravinyl compound is replaced with an equal amount by weight of said divinyl compound.

Additional substrates are coated in like manner except that in the paint binder solution 25 weight percent of the tetravinyl compound is replaced with an equal amount by weight of said divinyl compound.

Additional substrates are coated in like manner except that in the paint binder solution 1 weight percent of Resin A is replaced with an equal amount by weight of said divinyl compound.

Additional substrates are coated in like manner except that in the paint binder solution 25 weight percent of Resin A is replaced with an equal amount by weight of said divinyl compound.

Additional substrates are coated in like manner except that in the paint binder solution 49 weight percent of Resin A is replaced with an equal amount by weight of said divinyl compound.

EXAMPLE 28

The procedure of Example 24 is repeated except for the sole difference that benzoyl chloride is substituted for butyric acid chloride.

EXAMPLE 29

The procedures of Examples 24, 25, 26, 27 and 28 are repeated except that the polyester resin, Resin B, is substituted for the vinyl resin, Resin A.

EXAMPLE 30

The procedure of Example 1 is repeated except that 49 weight percent of the tetravinyl compound is replaced with an equal amount by weight of monovinyl monomers, i.e., methyl methacrylate, ethyl acrylate, butyl methacrylate and 2-ethyl-hexyl acrylate.

EXAMPLE 31

The procedure of Example 1 is repeated except that 1 weight percent of the tetravinyl compound is replaced with an equal amount by weight of monovinyl monomers, i.e., methyl methacrylate and styrene in an equimolar mixture.

EXAMPLE 32

The procedure of Example 1 is repeated except that 25 weight percent of the tetravinyl compound is replaced with an equal amount by weight of monovinyl monomers, i.e., methyl methacrylate, butyl acrylate and styrene in an equimolar mixture.

EXAMPLE 33

The procedure of Example 1 is repeated except that 49 weight percent of Resin A is replaced with an equal amount by weight of monovinyl monomers, i.e., methyl methacrylate, ethyl acrylate, butyl methacrylate and 2-ethylhexyl acrylate.

EXAMPLE 34

The procedure of Example 1 is repeated except that 1 weight percent of Resin A is replaced with an equal amount by weight of monovinyl monomers, i.e., methyl methacrylate and styrene in an equimolar mixture.

EXAMPLE 35

The procedure of Example 1 is repeated except that 25 weight percent of Resin A is replaced with an equal amount by weight of styrene.

EXAMPLE 36

The procedure of Example 2 is repeated except that 49 weight percent of the tetravinyl compound is replaced with an equal amount by weight of monovinyl monomers, i.e., methyl methacrylate, alpha-methyl styrene, butyl acrylate and ethyl acrylate.

EXAMPLE 37

The procedure of Example 2 is repeated except that 1 weight percent of the tetravinyl compound is replaced with an equal amount by weight of monovinyl monomers, i.e., methyl methacrylate.

EXAMPLE 38

The procedure of Example 2 is repeated except that 25 weight percent of the tetravinyl compound is replaced with an equal amount by weight of monovinyl monomers, i.e., methyl methacrylate, hydroxyethyl methacrylate and ethyl acrylate in equimolar amounts.

EXAMPLE 39

The procedure of Example 2 is repeated except that 49 weight percent of Resin B is replaced with an equal amount by weight of methyl methacrylate.

EXAMPLE 40

The procedure of Example 2 is repeated except that 1 weight percent of Resin B is replaced with an equal amount by weight of methyl methacrylate.

EXAMPLE 41

The procedure of Example 2 is repeated except that 25 weight percent of Resin B is replaced with an equal amount by weight of styrene.

EXAMPLE 42

The procedure of Example 1 is repeated except that 25 weight percent of the tetravinyl compound and 25 weight percent of Resin A are replaced with an equal amount by weight of an equimolar mixture of styrene and methyl methacrylate.

EXAMPLE 43

The procedure of Example 2 is repeated except that 25 weight percent of the tetravinyl compound and 25 weight percent of Resin B are replaced with an equal amount by weight of an equimolar mixture of styrene and methyl methacrylate.

The term "ionizing radiation" as employed herein means radiation having sufficient energy to effect polymerization of the paint films herein disclosed, i.e., energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece when the intervening space is occupied by air. Adjustment can be made for the relative resistance of the intervening gas which is preferably an oxygen-free inert gas such as nitrogen or helium.

The abbreviation "rad" as employed herein means that dose of radiation which results in the absorption of 100 ergs of energy per gram of absorber, e.g. coating film. The abbreviation "Mrad" as employed herein means 1 million rad. The electron emitting means may be a linear electron accelerator capable of producing a direct current potential in the range of about 100,000 to about 500,000 volts. In such a device electrons are ordinarily emitted from a hot filament and accelerated through a uniform voltage gradient. The electron beam, which may be about ⅛ inch in diameter at this point, may then be scanned to make a fan-shaped beam and then passed through a metal window, e.g., a magnesium-thorium alloy, aluminum, an alloy of aluminum and a minor amount of copper, etc., of about 0.003 inch thickness.

It will be understood by those skilled in the art that modifications can be made within the foregoing examples without departing from the spirit and scope of the invention as set forth in the following claims.

What is claimed is:

1. A paint polymerizable by ionizing radiation which, exclusive of nonpolymerizable solvents, pigments and particulate mineral filler, consists essentially of a film-forming solution of about 20 to about 90 parts of an alpha-beta olefinically unsaturated resin having molecular weight in excess of about 1,000 and about 80 to about 10 parts by weight of a tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide.

2. A paint in accordance with claim 1 wherein said diepoxide has a molecular weight below about 2,000.

3. A paint in accordance with claim 1 wherein said diepoxide has a molecular weight in the range of about 140 to about 500.

4. A paint in accordance with claim 1 wherein said alpha-beta olefinically unsaturated resin contains about 0.5 to about 5 units of alpha-beta olefinic unsaturation units per 1,000 units molecular weight and has a molecular weight in the range of about 2,000 to about 20,000.

5. A paint in accordance with claim 1 wherein said alpha-beta olefinically unsaturated resin contains about 0.7 to about 3 units of alpha-beta olefinic unsaturation per 1,000 units molecular weight and has a molecular weight in the range of about 2,000 to about 20,000 and said diepoxide compound has a molecular weight in the range of about 140 to about 500.

6. A paint in accordance with claim 1 wherein said acyl halide is the chloride of acrylic or methacrylic acid.

7. A paint in accordance with claim 1 wherein said acyl halide is the bromide of acrylic or methacrylic acid.

8. A paint in accordance with claim 1 wherein an amount up to but less than 50% of said alpha-beta olefinically unsaturated resin is replaced with an equal amount by weight of a divinyl compound consisting essentially of carbon, hydrogen and oxygen and having a molecular weight below about 2,600.

9. A paint in accordance with claim 1 wherein an amount up to but less than 50% of said alpha-beta olefinically unsaturated resin is replaced with an equal amount by weight of a divinyl compound consisting essentially of carbon, hydrogen and oxygen and having a molecular weight in the range of about 220 to about 1,100.

10. A paint in accordance with claim 1 wherein an amount up to but less than 50% of said alpha-beta olefinically unsaturated resin is replaced with an equal amount by weight of monovinyl monomers.

11. A paint in accordance with claim 1 wherein an amount up to but less than 50% of said tetravinyl compound is replaced with an equal amount by weight of a divinyl compound consisting essentially of carbon, hydrogen and oxygen and having a molecular weight below about 2,600.

12. A paint in accordance with claim 1 wherein an amount up to but less than 50% of said tetravinyl compound is replaced with an equal amount by weight of a divinyl compound consisting essentially of carbon, hydrogen and oxygen and having a molecular weight in the range of about 220 to about 1,100.

13. A paint in accordance with claim 1 wherein an amount up to but less than 50% of said tetravinyl compound is replaced with an equal amount by weight of monovinyl monomers.

14. A paint polymerizable by ionizing radiation which, exclusive of nonpolymerizable solvents, pigments and particulate mineral filler, consists essentially of a film-forming solution of about 40 to about 80 parts by weight of an alpha-beta olefinically unsaturated resin having a molecular weight in the range of about 1,000 to about 20,000 and about 60 to about 20 parts by weight of a tetravinyl compound formed by first reacting one molar part of a diepoxide having a molecular weight in the range of about 140 to about 500 with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide.

15. A paint in accordance with claim 14 wherein an amount up to but less than 50% of said tetravinyl compound is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

16. A paint in accordance with claim 14 wherein an amount up to but less than 50% of said alpha-beta olefinically unsaturated resin is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of a saturated acyl halide.

17. A paint in accordance with claim 14 wherein an amount up to but less than 50% of said tetravinyl compound is replaced with an equal amount by weight of monovinyl monomers.

18. A paint in accordance with claim 14 wherein an amount up to but less than 50% of said alpha-beta olefinically unsaturated resin is replaced with an equal amount by weight of monovinyl monomers.

19. A paint in accordance with claim 14 wherein an amount up to but less than 50% of said tetravinyl compound is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of an alpha-beta olefinically unsaturated acyl halide having an aromatic radical affixed to the beta carbon of the olefinic linkage.

20. A paint in accordance with claim 14 wherein an amount up to but less than 50% of said alpha-beta olefinically unsaturated resin is replaced with an equal amount by weight of a divinyl compound having a molecular weight in the range of about 220 to about 650 and formed by first reacting one molar part of a diepoxide with two molar parts of an alpha-beta olefinically unsaturated monocarboxylic acid selected from acrylic acid and methacrylic acid and subsequently reacting the resultant ester condensation product with two molar parts of an alpha-beta olefinically unsaturated acyl halide having an aromatic radical affixed to the beta carbon of the olefinic linkage.

21. A paint in accordance with claim 14 wherein an amount up to but less than 50% of said alpha-beta olefinically unsaturated resin is replaced with an equal amount by weight of a divinyl compound having a molecular weight in the range of about 220 to about 650 and formed by reacting one molar part of a diepoxide with two molar parts of an alpha-beta olefinically unsaturated monocarboxylic acid selected from acrylic acid and methacrylic acid.

22. A paint in accordance with claim 14 wherein an amount up to but less than 50% of said tetravinyl compound is replaced with an equal amount by weight of a divinyl compound having a molecular weight in the range of about 220 to about 650 and formed by reacting one molar part of a diepoxide with two molar parts of an alpha-beta olefinically unsaturated monocarboxylic acid selected from acrylic acid and methacrylic acid.

23. A paint in accordance with claim 14 wherein an amount up to but less than 50% of said tetravinyl compound is replaced with an equal amount by weight of a divinyl compound having a molecular weight in the range of about 220 to about 650 and formed by reacting one molar part of a diepoxide with two molar parts of an alpha-beta olefinically unsaturated monocarboxylic acid selected from acrylic acid and methacrylic acid and subsequently reacting the resultant ester condensation product with two molar parts of an aromatic substituted saturated acyl halide.

24. A paint in accordance with claim 14 wherein an amount up to but less than 50% of said alpha-beta olefinically unsaturated resin is replaced with an equal amount by weight of a divinyl compound having a molecular weight in the range of about 220 to about 650 and formed by reacting one molar part of a diepoxide with two molar parts of an alpha-beta olefinically unsaturated monocarboxylic acid selected from acrylic acid and methacrylic acid and subsequently reacting the resultant ester condensation product with two molar parts of an aromatic substituted saturated acyl halide.

25. A paint in accordance with claim 14 wherein an amount up to but less than 50% of said alpha-beta olefinically unsaturated resin is replaced with an equal amount by weight of a divinyl compound having a molecular weight in the range of about 220 to about 650 and formed by first reacting a monoepoxide with an alpha-beta olefinically unsaturated monocarboxylic acid selected from acrylic acid and methacrylic acid and subsequently reacting the resultant ester condensation product with a vinyl unsaturated acyl halide.

26. A paint in accordance with claim 14 wherein an amount up to but less than 50% of said tetravinyl compound is replaced with an equal amount by weight of a divinyl compound having a molecular weight in the range of about 220 to about 650 and formed by first reacting a monoepoxide with an alpha-beta olefinically unsaturated monocarboxylic acid selected from acrylic acid and methacrylic acid and subsequently reacting the resulting ester condensation product with a vinyl unsaturated acyl halide.

27. In a method for painting a substrate wherein a film-forming solution is applied as a paint film to a surface of said substrate and crosslinked thereon by exposing the coated surface to ionizing radiation, the improvement wherein said film-forming solution, exclusive of nonpolymerizable solvents, pigments and particulate mineral filler, consists essentially of a film-forming solution of about 20 to about 90 parts by weight of an alpha-beta olefinically unsaturated resin having molecular weight in excess of about 1,000 and about 80 to about 10 parts by weight of a tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide.

28. An article of manufacture comprising in combination a substrate and a polymerized coating of paint formed upon an external surface thereof by applying to said surface a film of substantially even depth of a film-forming solution which, exclusive of nonpolymerizable solvents, pigments and particulate mineral filler, consists essentially of about 20 to about 90 parts by weight of an alpha-beta olefinically unsaturated resin having molecular weight in the range of about 1,000 to about 20,000 and about 80 to about 10 parts by weight of a tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of a vinyl unsaturated acyl halide, and cross-linking said film upon said surface with ionizing radiation.

References Cited
UNITED STATES PATENTS 3,466,259    9/1969    Jernigan    260—836X

FOREIGN PATENTS 1,006,587    10/1965    Great Britain    260—486

ALFRED L. LEAVITT, Primary Examiner

J. H. NEWSOME, Assistant Examiner

U.S. Cl. X.R.

117—138.8, 161; 204—159.15, 159.16; 260—410.6, 475, 485, 486, 835, 836, 857